(12) United States Patent
Kato

(10) Patent No.: US 11,241,962 B2
(45) Date of Patent: Feb. 8, 2022

(54) EVALUATION APPARATUS FOR DISPLAY ARBITRATION CONTROL AND GENERATION APPARATUS FOR RULE DEFINITION FILE

(71) Applicant: DENSO CORPORATION, Kariya (JP)

(72) Inventor: Shigeo Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/073,881

(22) Filed: Oct. 19, 2020

(65) Prior Publication Data

US 2021/0031629 A1 Feb. 4, 2021

Related U.S. Application Data

(63) Continuation of application No. PCT/JP2019/005601, filed on Feb. 15, 2019.

(30) Foreign Application Priority Data

Apr. 26, 2018 (JP) .............................. JP2018-085179

(51) Int. Cl.
*B60K 35/00* (2006.01)
*G06N 5/02* (2006.01)

(52) U.S. Cl.
CPC ............. *B60K 35/00* (2013.01); *G06N 5/025* (2013.01); *B60K 2370/1529* (2019.05);
(Continued)

(58) Field of Classification Search
None
See application file for complete search history.

(56) References Cited

U.S. PATENT DOCUMENTS

| | | | | |
|---|---|---|---|---|
| 2007/0088472 A1* | 4/2007 | Ganzhorn, Jr. | ..... | G01M 15/102 701/31.4 |
| 2012/0242513 A1* | 9/2012 | Oguchi | ............. | G01M 17/0074 340/995.27 |

(Continued)

FOREIGN PATENT DOCUMENTS

| | | |
|---|---|---|
| JP | 5742799 B2 | 7/2015 |
| JP | 5796566 B2 | 10/2015 |
| JP | 2018020732 A | 2/2018 |

OTHER PUBLICATIONS

Kato, Jiro. Denso's Model Driven Development Product Line Development by Denso (Second Part). Nikkei Electronics, Sep. 17, 2012, No. 1091, pp. 85-101, ISSN 0385-1680.

(Continued)

*Primary Examiner* — Toan H Vu
(74) *Attorney, Agent, or Firm* — Harness, Dickey & Pierce, P.L.C.

(57) ABSTRACT

An evaluation apparatus for display arbitration control or a generation apparatus for a rule definition file includes a model generation portion that models the display arbitration control and generates a rule-based arbitration specification model that includes a content definition that defines a content, an area definition that defines a display area, and a constraint expression that shows a constraint related to display of the content; and a rule definition file generation portion that generates the rule definition file for software that is installed in a product and is related to the display arbitration control.

10 Claims, 4 Drawing Sheets

(52) U.S. Cl.
CPC .. *B60K 2370/167* (2019.05); *B60K 2370/182* (2019.05); *B60K 2370/186* (2019.05)

(56) References Cited

U.S. PATENT DOCUMENTS

| | | |
|---|---|---|
| 2014/0114531 A1 | 4/2014 | Sugiyama et al. |
| 2014/0152433 A1 | 6/2014 | Sugiyama et al. |
| 2014/0244110 A1* | 8/2014 | Tharaldson ............ G06Q 50/01 701/36 |
| 2014/0277971 A1* | 9/2014 | Oshiro ................ B60W 40/09 701/51 |
| 2014/0340212 A1 | 11/2014 | Ueda et al. |
| 2016/0003621 A1* | 1/2016 | Koenig ............... G06F 3/04845 701/31.4 |
| 2017/0129337 A1* | 5/2017 | Sano ...................... B29C 33/42 |
| 2018/0202371 A1* | 7/2018 | Matsuoka ............ G07C 5/0816 |
| 2019/0278300 A1* | 9/2019 | Katsuki ............ B60W 50/0098 |
| 2020/0331486 A1* | 10/2020 | Wieczorek ......... G06K 9/00845 |

OTHER PUBLICATIONS

Atarashi, Yoshitaka, Kujira, Toshihiro, Doi, Keiji, Fukaya, Naohiko, Hara, Takahiro, Nishio, Shojiro. Model-based Development of a HMI Tool for Embedded Svstems. IPSJ SIG Technical Report, Jul. 2, 2007, vol. 2007, No. 65, pp. 1-6 (2007-DBS-143-1), ISSN 0919-6072.

* cited by examiner

EVALUATION APPARATUS FOR DISPLAY ARBITRATION CONTROL AND GENERATION APPARATUS FOR RULE DEFINITION FILE

CROSS REFERENCE TO RELATED APPLICATIONS

The present application is a continuation application of International Patent Application No. PCT/JP2019/005601 filed on Feb. 15, 2019, which designated the U.S. and claims the benefit of priority from Japanese Patent Application No. 2018-085179 filed on Apr. 26, 2018. The entire disclosures of all of the above applications are incorporated herein by reference.

TECHNICAL FIELD

The present disclosure relates to an evaluation apparatus for display arbitration control and a generation apparatus for a rule definition file.

BACKGROUND

There are various contents displayed in an interior of a vehicle. Due to diversification of the displayed contents, various display devices for displaying the contents are mounted. Under such a circumstance, display arbitration control for arbitrating which content is displayed in which display area of which display device is important.

SUMMARY

An evaluation apparatus for display arbitration control or a generation apparatus for a rule definition file may include a model generation portion that models the display arbitration control and generate a rule-based arbitration specification model that may include a content definition that may define a content, an area definition that may define a display area, and a constraint expression that may show a constraint related to display of the content; and a rule definition file generation portion that may generate the rule definition file for software that may be installed in a product and be related to the display arbitration control.

BRIEF DESCRIPTION OF DRAWINGS

The above and other features and advantages of the present disclosure will become more apparent from the following detailed description made with reference to the accompanying drawings. In the drawings.

DETAILED DESCRIPTION

Figure 1:
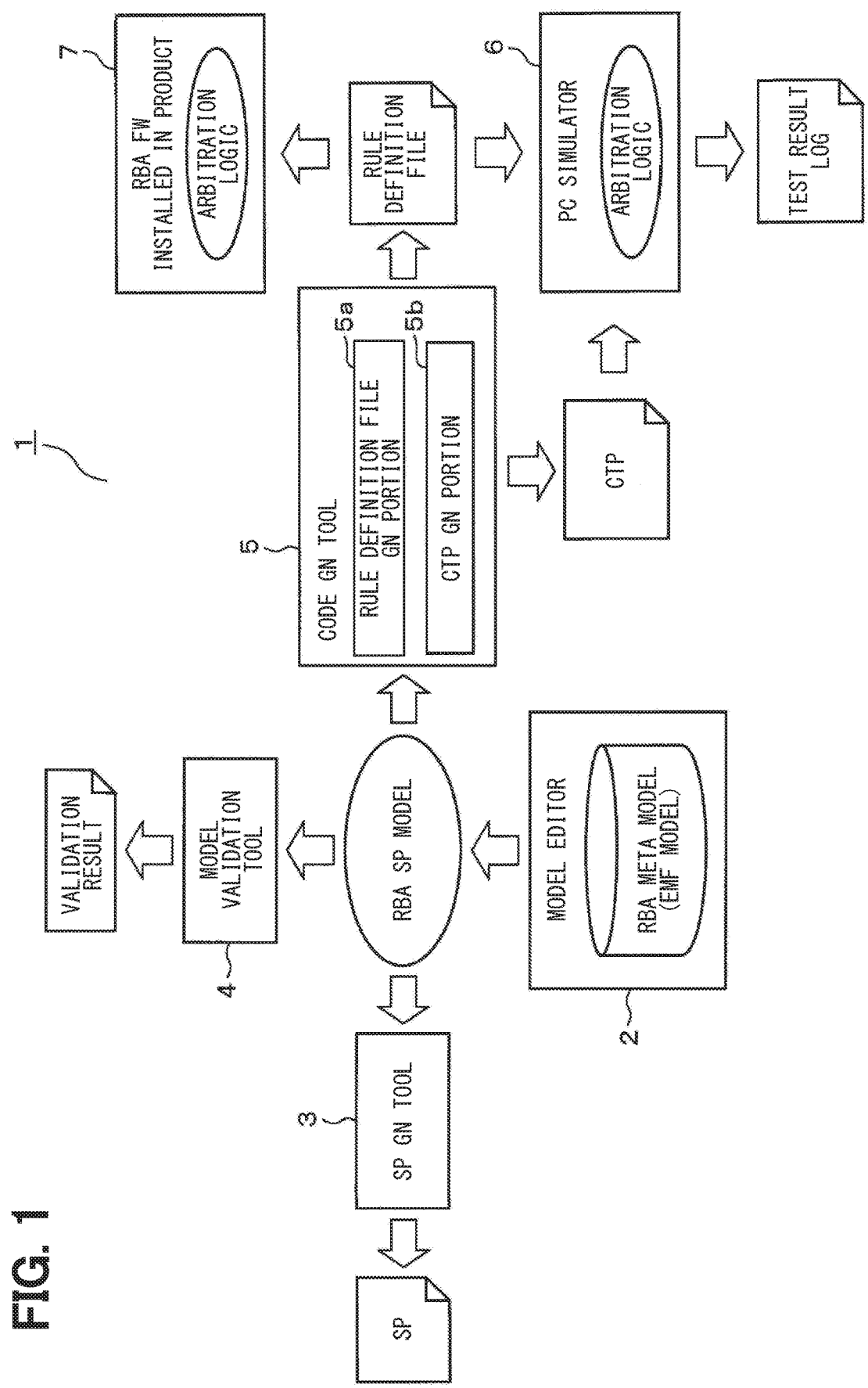
FIG. 1 is a diagram showing a tool configuration according to one embodiment.

There are various contents displayed in an interior of a vehicle. The various contents include, for example, a travel type content directly related to a vehicle travel such as a vehicle speed, an engine rotation speed, a shift position, or a remaining amount of fuel and a non-travel type content directly not related to the vehicle travel such as map information for navigation, air conditioner setting information, or audio information. Due to diversification of the displayed contents, various display devices for displaying the contents are mounted. The various display devices include, for example, a center display placed on a center console, a head-up display, a graphic meter, or the like. Depending on the display device, multiple different contents can be simultaneously displayed in multiple display areas. Under such a circumstance, display arbitration control for arbitrating which content is displayed in which display area of which display device is important.

In one example technique, a specification of the display arbitration control is defined by using a matrix or a state transition, and it is evaluated to whether the specification of the display arbitration control is provided as intended. However, in the technique of defining the specification by using the matrix and the state transition, as the number of contents increases, the complexity of the specification increases in proportion to the square of the number. Therefore, in recent years, the number of contents tends to increase, and it is difficult to deal with the increase in the number of contents. It is difficult to appropriately to evaluate whether the specification of the display arbitration control is provided as intended. As the result, the display arbitration control of the contents may not be appropriately executed.

For example, in a technique of a comparative example, content information in which a content is associated with an information value of the content is managed, and an attribute of a display area is managed as area information, an optimum combination of the content and the display area is determined based on the content information and the area information.

In the technique of the comparative example, the rule-based specification of the display arbitration control is defined, and thereby the display arbitration control that can deal with the increase in the number of contents without increasing the complexity of the specification can be performed. In the technique of the comparative example, although description of the specification can be simplified, it is difficult to understand the specific behavior of the display arbitration control. Further, a specification having a contradiction between rules may be obtained, and therefore it is difficult to notice the contradiction. Furthermore, for evaluating whether the specification is provided as intended, it is necessary to confirm the behavior of an actual machine that is actually operated. Therefore, even when the specification has a failure, the failure is corrected at the latter stage of software development and a working process increase.

One example provides an evaluation apparatus for display arbitration control and a generation apparatus for a rule definition file that are capable of appropriately evaluating whether to provide a specification as intended.

According to one example embodiment, a model generation portion models the display arbitration control and generates a rule-based arbitration specification model that includes a content definition that defines a content, an area definition that defines a display area, and a constraint expression that shows a constraint related to display of the content. A rule definition file generation portion generates a rule definition file for software that is installed in a product and is related to the display arbitration control, based on the rule-based arbitration specification model after a validation result of a validated rule-based arbitration specification model is confirmed to be positive. A comprehensive test pattern generation portion generates a comprehensive test pattern based on the rule-based arbitration specification model. A simulation portion executes automatic simulation of whether a combination of the content defined by the content definition and the display area defined by the area definition satisfies the constraint shown by the constraint expression, by using the comprehensive test pattern and outputs a simulation result as a test result log.

That is, the display arbitration control is modeled, and the rule-based specification model is generated. After a validation result of a validated rule-based arbitration specification model is confirmed to be positive, whether the combination of the content and the display area satisfies the constraint shown by the constraint expression is automatically simulated with use of the comprehensive test pattern. The simulation result is output as the test result log. By analyzing the test result log of the simulation, it becomes easy to understand the specific behavior of the display arbitration control. Further, the condition that should be satisfied by the arbitration result is described by the constraint expression. Thereby, it may be possible to define only the specification having no contradiction between the rules, and remove the specification having the contradiction between the rules. Furthermore, the evaluation using the test result log is executed before the software related to the display arbitration control is installed in the product. Thereby, even when the specification has the failure, it may be possible to correct the failure at the early stage of the software development, and avoid the increase in the working processes before the increase occurs. Thereby, it may be possible to appropriately evaluate whether the specification of the display arbitration control is provided as intended.

Hereinafter, an embodiment will be described with reference to the drawings. As shown in FIG. 1, an evaluation apparatus 1 for display arbitration control is a part of an environment for developing software installed in a product. The evaluation apparatus 1 includes a model editor 2 (corresponding to a model generation portion), a specification generation tool 3 (corresponding to a specification generation portion), a model validation tool 4 (corresponding to a model validation portion), and a code generation tool 5, and a PC simulator 6 (corresponding to a simulation portion). The evaluation apparatus 1 for the display arbitration control includes a computer that has a CPU (central processing unit), a ROM (read only memory), an I/O (input/output), or the like. The evaluation apparatus 1 generates a rule-based arbitration (hereinafter, RBA) specification model, generates a specification, outputs a validation result, and generates a rule definition file and a comprehensive test pattern or the like by executing a program stored in a non-transitory tangible storage medium. The editor 2, the tools 3 to 5, and the PC simulator 6 include program modules. In the drawings, the term of "specification" may be also referred to as "SP", the term of "generation" may be also referred to as "GN", and the term of "comprehensive test pattern" may be also referred to as "CTP".

The model editor 2 models the display arbitration control by using a RBA meta model (EMF (eclipse modeling framework) model), and generates the RBA specification model. The evaluation apparatus 1 for the display arbitration control generates the specification, validates the model, and generates codes based on the RBA specification model generated by the model editor 2.

The specification generation tool 3 generates the specification by using the RBA specification model. The RBA specification model is used for machine decoding, and the specification is used for operator decoding.

The model validation tool 4 validates whether there is a contradiction between rules of the RBA specification model, and outputs the validation result. When determining that there is no contradiction between the rules of the RBA specification model, the model validation tool 4 outputs the validation result that the display arbitration control can be appropriately executed. When determining that there is the contradiction between the rules of the RBA specification model, the model validation tool 4 outputs the validation result that the display arbitration control cannot be appropriately executed.

The code generation tool 5 includes a rule definition file generation portion 5a and a comprehensive test pattern generation portion 5b. The rule definition file generation portion 5a generates the rule definition file for software installed in a product by using the RBA specification model, and outputs the generated rule definition file. The rule definition file is added to a RBA framework 7 installed in the product. That is, since the rule definition file is added to the RBA framework 7, the product executes the rule definition file in accordance with arbitration logic and executes the display arbitration control. The comprehensive test pattern generation portion 5b generates the comprehensive test pattern for the simulator by using the RBA specification model, and outputs the generated comprehensive test pattern for the simulator. The rule definition file is a file obtained by converting a rule-based arbitration specification model file based on a format specified so as to be easily understood by the arbitration logic. In this conversion, the model file easily understood by the human is automatically converted into a format content easily understood by the machine. Due to this conversion, it may be possible to generate a simple and compact file based on the rule-based arbitration specification model file. The specified format is, for example, a JSON (JavaScript Object Notation) format. However, the specified format is not limited to this.

The PC simulator 6 has a function of executing the comprehensive test pattern. The PC simulator 6 receives the rule definition file and the comprehensive test pattern for the simulator from the code generation tool 5, executes the received rule definition file in accordance with the arbitration logic by using the comprehensive test pattern, and automatically executes simulation. The comprehensive test pattern is generated based on a combination of the contents. The arbitration is executed when the contents that can be displayed in the same display area simultaneously occur. When the number of contents is n (n is a natural number) and the arbitration of the m contents (m is the natural number, n≥m) for the same display area is executed, the following number of comprehensive test patterns are generated.

$$_nP_m = n!/(n-m)!$$

("!" indicates factorial)

That is, the PC simulator 6 automatically simulates the combination of the contents by the function of executing the comprehensive test pattern, and automatically simulates the behavior of the rule defined by the RBA specification model. Each of the "n" as the number of contents and the "m" as the number of arbitrated contents is set by the operator. When the simulation ends, the PC simulator 6 outputs the evaluation result as a test result log.

Here, a difference between the model validation by the model validation tool 4 and simulation evaluation by the PC simulator 6 will be described. The model validation is validation for checking whether an area definition, a content definition, and a constraint expression are not contradicted (that is, satisfiable), and is a technique that executes validation by only using the model information without using the actual arbitration logic. In the model validation, it can be validated whether the constraint expression can be satisfied for all combinations that may be obtained, and complete coverage is possible. However, an arbitration result cannot be output. That is, in the model validation, although whether to solve the problem is determined, the solution is not determined.

The simulation evaluation is a technique of executing evaluation by using the actual arbitration logic. In the simulation evaluation, the arbitration result can be output, and the behavior of the display arbitration control is understood. The simulation evaluation can be manually or automatically executed. However, the simulation evaluation cannot validate whether the constraint expression is satisfied for all combinations that may be obtained, and the complete coverage may be impossible. In the simulation evaluation, a coverage at execution is measured while the number (N) of combinations is increased. The measurement continues until a certain standard is satisfied.

An example of the coverage at the execution will be shown below.

The content that can be displayed in each area is displayed at least once.

The arbitration between any two contents is executed at least once in each area.

Condition evaluation of each node of the constraint expression is covered (condition coverage).

For example, a constraint expression of "if A and B, !C(A AND→!C)" is assumed. The evaluation is continued until all patterns are covered. The patterns include a pattern that A is true, a pattern that A is false, a pattern that B is true, a pattern that B is false, a pattern that (A AND B) is true, a pattern that (A AND B) is false, a pattern that C is true, a pattern that C is false, a pattern that (A AND B→!C) is true, and a pattern that (A AND B→!C) is false.

Next, a configuration of the RBA specification model and the arbitration logic will be sequentially described.

(1) Configuration of RBA Specification Model

The RBA specification model includes the area definition, the content definition, and the constraint expression. The area definition defines, as a display location, a position of the display area, an overlapping order of the display areas, and the size of the display area. The area definition defines, as the value of the display location, priority and visibility. The area definition defines, as arbitration policy, priority arbitration, last-come-first-served arbitration, and value-based arbitration. The priority arbitration is arbitration policy for each display area and arbitration that displays the most valuable content among the contents that can be displayed in the display area. The last-come-first-served arbitration is the arbitration policy for each display area and arbitration that displays a content requested last in the display area. When the display of the content requested last ends, the last-come-first-served arbitration displays a content requested last among the remaining contents. The value-based arbitration is arbitration policy for all display areas and displays the content so that a calculation value obtained by multiplying a numerical value obtained by quantifying the content value by a numerical value obtained by quantifying the display area value is maximized. In the drawings, the term of "last-come-first-served" may be also referred to as "LCFS".

The content definition defines, as a state of the display content, for example, normal display and warning display. The content definition defines, as the display content value, the priority. The content definition defines, as a displayable display area, multiple display areas. The constraint expression defines a condition that should be satisfied by the arbitration result, a condition (runtime constraint) of display area suppression or content suppression, a constraint of the model validation, and a constraint of simulator evaluation.

The content has an attribute called "GoodLoser". The "GoodLoser" is an attribute of withdrawing a request or leaving the request when the arbitration is lost. In a case of "GoodLoser=true", the request is withdrawn when the arbitration is lost. An example of using the "GoodLoser" will be described below. Regarding the area definition, a display area (A) of a normal screen and a display area (B) of interruption are the last-come-first-served policy. Regarding the content definition, the content that can be displayed in the display area (A) is, for example, a navigation, an audio, a travel support, or the like. The content that can be displayed in the display area (B) is, for example, a TbT (Turn by Turn) notification or the like. The constraint expression of "B.isDisplayed( )→A.isHidden( )" means that the interruption area (B) hides the normal screen (A) after a content in the interruption area (B) is displayed. The constraint of "(pre)navigation.isVisible( )→!TbTnotification.isVisible( )" means that the TbT interruption notification is not executed when the navigation is displayed.

The difficulties of the model described above are the followings.

1. In a case where the simulation of the model is executed and the navigation is displayed, the TbT notification is not displayed due to the constraint expression (as intended) even when the display of the TbT notification is requested.

2. Next, when the display of the audio is requested, the audio is displayed (as intended) since the display area (A) last comes and is first served.

3. Furthermore, next, when the display of the travel support is requested, the TbT notification is displayed. This is not an intended behavior. It is troublesome that the TbT notification is displayed when the navigation is not displayed in the previous state.

When the arbitration of the TbT notification is lost, the request must be withdrawn. Therefore, it is implemented by setting this to the "GoodLoser".

The logical expression that can be handled in the constraint expression is a state of the content, a state of the display area, the content being displayed in the display area, a content set, a logical calculation, and a quantification symbol. The content state is active, inactive, being displayed, or not being displayed. The display area state is being displayed or not being displayed. The logical calculation includes NOT(!), AND, OR, implication (→), and equal sign (=). The quantification symbol includes ∀ (For all: the condition is satisfied for all elements of the set) and ∃ (Exists: at least one element satisfying the condition exists in the set)

The constraint expression defines that a state before the arbitration can be used as the condition and defines whether the area provided by the term "isHidden" is hidden. An example using "isHidden" will be described below.

```
For-All ALL_CONTENTS{x |
    (!(pre)x. isVisible( ) AND x. isVisible( ))
    -> (!(pre)x. isActive( ) OR
        Exists ALL_AREAS{ a |
            a. displayingContent( ) == x AND (
                ((pre)a. isVisible( ) AND !(pre)a. displayingContent( ).
                isActive( ))
                OR(pre)a. isHidden( )
            )
        }
    )
}
```

The above description means "a content to be newly displayed must be: (i) a content which was requested to hide the display thereof at the previous time (i.e., a content which is requested to display the content at this time); or (ii) a content to be newly displayed at this time in an area in which a display request of a previous display content was cancelled; or (iii) a content to be newly displayed at this time in an area which was hidden at the previous time". By evaluating this constraint expression while executing the comprehensive test pattern in the simulation, it may be possible to detect the behavior unintended by the operator. By detecting the behavior unintended by the operator in such a manner, it may be possible to check forgetting of the setting of the "GoodLoser" described above. When one failure is detected in such a manner, the constraint expression for the evaluation is used and the simulation of the comprehensive evaluation is executed. Thereby, it may be possible to check the existence of the failure similar to the failure detected this time.

(2) Arbitration Logic

The arbitration logic includes arbitration for each display area and arbitration for the entire display area. The arbitration for each display area arbitrates the display area of the priority arbitration and the last-come-first-served arbitration in descending order of the value of the display area. For each display area, the most prioritized content is provisionally assigned. When the evaluation result of the constraint expression is positive, the provisionally assigned content is confirmed. When the evaluation result of the constraint expression is negative, the next prioritized content is evaluated again. When there is no content satisfying the constraint expression, the content is not displayed in the display area.

The arbitration (value-based arbitration) for the entire display area includes best fit logic and one pass logic. The best fit logic selects the highest total value among all the combinations of the content satisfying the constraint expression and the display area. The one pass logic arbitrates the priorities in order from the display area with the highest value, and arranges the content with the high value in the display area with the high value. The content already assigned to other display area is excluded from the targets of the arbitration.

Figure 2:
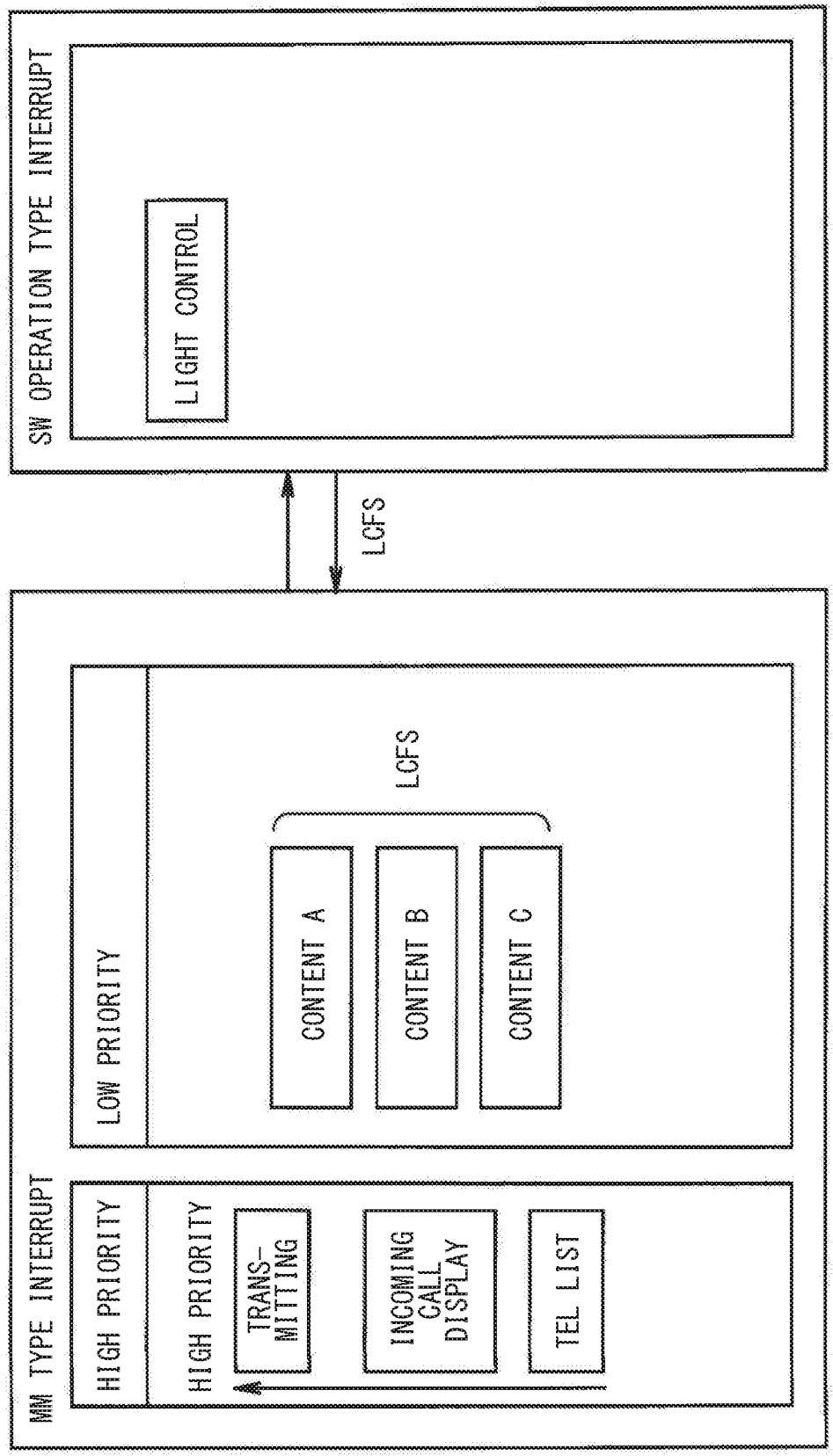
FIG. 2 is a diagram showing a sample model.

FIG. 2 exemplifies sample models of a multimedia type interrupt and a switch operation type interrupt. The content suppression does not provide the interrupt notification while a content C is normally displayed. A description of "center. displayingContent( )=content C→! contentCnotification. .isVisible( )" is a constraint that the notification of the content C is not displayed when the content C is displayed in a center display area. When the last-come-first-served arbitration and the priority arbitration coexist, the last-come-first-served arbitration is basically prioritized. However, the TEL is prioritized during the MM type interrupt. A description of "TEL.isActive( )→For All MMtypeinterrupt(other than TEL) {x|! x.isVisible( )}" is a constraint that all of the MM type interrupts (other than TEL) are not displayed when the TEL is active.

Figure 3:
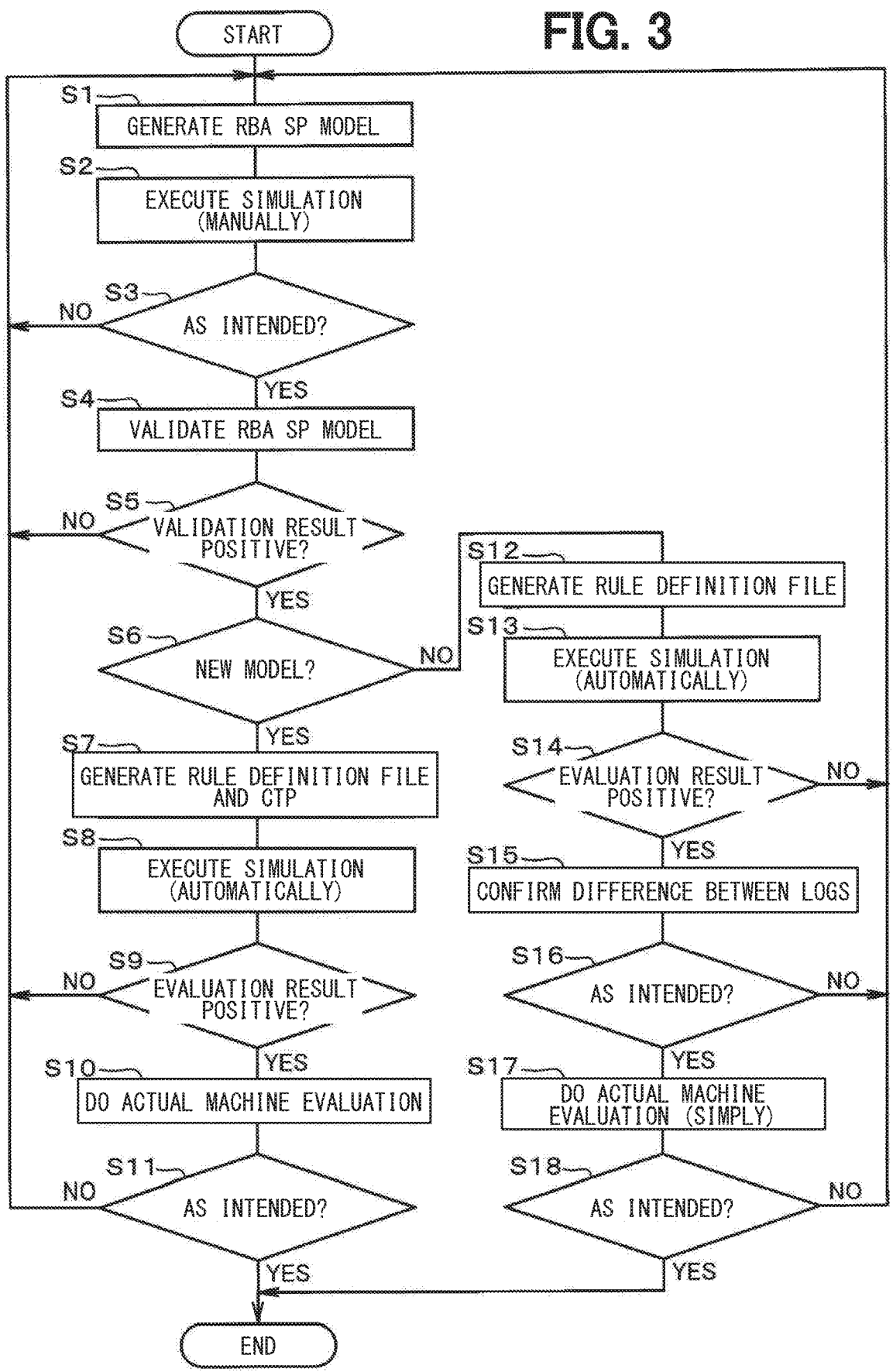
FIG. 3 is a flowchart.
Figure 4:
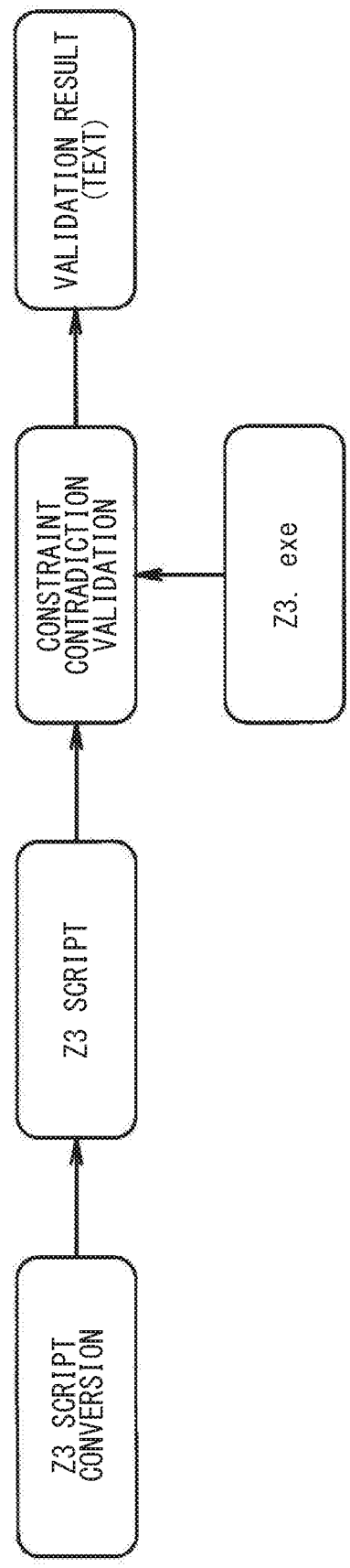
FIG. 4 is a diagram showing model validation.

Next, the above described configuration operation will be described with reference to FIGS. 3 and 4. The operator evaluates whether the specification of the display arbitration control is provided as intended according to the following procedure. First, the operator generates the RBA specification model by using the model editor 2 (S1, corresponding to a mode generation procedure) according to a description expression of the model. Next, the operator manually simulates the description of the RBA specification model generated by using the model editor 2, validates the specific behavior of the display arbitration control, and confirms whether an intended action is executed (S3). When the operator cannot confirm that the intended action is executed (S3: NO), the procedure returns to S1. The operator generates the RBA specification model by using the model editor 2 (S1), the operator repeats the procedures after S1.

When the operator can confirm that the intended action is executed (S3: YES), the operator validates the RBA specification model by using the model validation tool 4 (S4, corresponding to a model validation procedure). The operator executes validation by a formal method using a SMT solver (Z3), and checks whether a proposition of the predicate logic can be satisfied. As shown in FIG. 4, the SMT solver converts model information (area definition, content definition, constraint expression) into a Z3 script including the predicate logic, and executes the script in the Z3, and checks whether there is a contradiction in the model information (whether it can be satisfied).

Here, in addition to the constraint expression in the arbitration logic, the constraint expression for the evaluation can be manually added to the validated constraint expression. Although the validation by the comprehensive test pattern described later requires a huge amount of time, the validation by the SMT solver is completed in a short time (from a few seconds to a few minutes). Therefore, by executing the validation by the SMT solver, it may be possible to validate whether the specification has the logical contradiction in a short time. That is, the operator validates the RBA specification model first, removes a logical error, executes the simulation by using the comprehensive test pattern, and thereby executes the efficient evaluation.

The operator confirms whether the validation result obtained by validating the model is positive or negative (S5). When the operator cannot confirm that the validation result is positive (S5: NO), in this case also, the procedure returns to S1. The operator generates the RBA specification model by using the model editor 2 again (S1), and repeats the following procedures after S1.

When the operator can confirm that the validation result is positive (S5: YES), the operator confirms whether the model to be evaluated (in other words, the model of an evaluation target) at this time is a new model (S6). When confirming that the model to be evaluated at this time (S6: YES), the operator generates the rule definition file and the comprehensive test pattern by using the code generation tool 5 (S7, a rule definition file generation procedure and a comprehensive test pattern generation procedure) and executes the automatic simulation by using the PC simulator 6 (S8, corresponding to a simulation procedure). The operator evaluates the test result log output from the PC simulator 6, evaluates the specific behavior of the display arbitration control, and confirms whether the evaluation result is positive or negative (S9). When the operator cannot confirm that the evaluation result is positive (S9: NO), in this case also, the procedure returns to S1. The operator generates the RBA specification model by using the model editor 2 again (S1), and repeats the following procedures after S1.

When the operator can confirm that the evaluation result is positive (S9: YES), the operator executes evaluation by using an actual machine similar to the environment of the product (S10), and confirms whether the intended action is executed (S11). When the operator cannot confirm that the intended action is executed (S11: NO), the operator confirms whether the evaluation result of the actual machine is negative and, in this case also, the procedure returns to S1. The operator generates the RBA specification model by using the model editor 2 again (S1), and repeats the following procedures after S1. When the operator can confirm that the intended operation is executed (S11: YES), the operator confirms that the evaluation result of the actual machine is positive and ends the series of procedures.

When confirming that the model to be evaluated this time is not the new model and has the specification obtained by changing a specification of a model that was evaluated last time (S6: NO), the operator generates the rule definition file by using the code generation tool 5 (S12), evaluates the specific behavior of the display arbitration control by executing the automatic simulation (S13), and confirms whether the evaluation result is positive or negative (S14). When the operator cannot confirm that the evaluation result is positive (S14: NO), in this case also, the procedure returns to S1. The operator generates the RBA specification model by using the model editor 2 again (S1), and repeats the following procedures after S1.

When the operator can confirm that the evaluation result is positive (S14: YES), the operator confirms the difference of the test result log output from the PC simulator 6 (S15), and confirms whether the test result is an intended result (S16). When the operator cannot confirm that the test result is the intended result (S16: NO), in this case also, the procedure returns to S1. The operator generates the RBA specification model by using the model editor 2 again (S1), and repeats the following procedures after S1. When the operator can confirm that the test result is the intended result (S16: YES), the operator executes simple evaluation by using the actual machine (S17), and confirms whether the intended action is executed (S18).

When the operator cannot confirm that the intended action is executed (S18: NO), the operator confirms whether the simple evaluation result of the actual machine is negative and, in this case also, the procedure returns to S1. The operator generates the RBA specification model by using the model editor 2 again (S1), and repeats the following procedures after S1. When the operator can confirm that the intended operation is executed (S18: YES), the operator confirms that the simple evaluation result of the actual machine is positive and ends the series of procedures.

That is, when confirming the model to be evaluated this time is not the new mode and has the specification obtained by changing the specification of the model that was evaluated last time, the operator generates the rule definition file by using the code generation tool 5. However, the operator does not generate the comprehensive test pattern, evaluates the automatic simulation by using the comprehensive test pattern same as the previous comprehensive test pattern, evaluates the specific behavior of the display arbitration control, and compares the test result logs. Thereby, the operator can confirm whether the specification is changed as intended.

By executing the series of procedures described above, the operator can evaluate whether the rule definition file is correct. After no contradiction between the rules is confirmed, the software is installed in the RBA framework 7 of the product. Thereby, it may be possible to install the software having a guaranteed quality in the product, and implement the appropriate display arbitration control in the product.

The embodiment described above may provide effects as below. The display arbitration control is modeled. Whether the combination of the content and the display area satisfies the constraint shown by the constraint expression is automatically simulated with use of the comprehensive test pattern. The simulation result is output as the test result log. By analyzing the test result log of the simulation, it becomes easy to understand the specific behavior of the display arbitration control. Further, the condition that should be satisfied by the arbitration result is described by the constraint expression. Thereby, it may be possible to define only the specification having no contradiction between the rules, and remove the specification having the contradiction between the rules. Furthermore, the evaluation using the test result log is executed before the software related to the display arbitration control is installed in the product. Thereby, even when the specification has the failure, it may be possible to correct the failure at the early stage of the software development, and avoid the increase in the working processes before the increase occurs. Thereby, it may be possible to appropriately evaluate whether the specification of the display arbitration control is provided as intended. In addition, the comprehensive test pattern is automatically generated from the model, and thereby it may be possible to reduce generation processes of the comprehensive test pattern. The constraint expression for the evaluation enables automatic execution of the simulation evaluation. By sequentially executing the model validation, the simulation evaluation, and the actual machine evaluation, it may be possible to early correct the failure. It may be possible to greatly simplify actual machine evaluation requiring the highest number of processes when the specification is changed.

It is validated whether there is the contradiction in the rule-based arbitration specification model. The RBA specification model is validated first, the logical error is removed, and the simulation using the comprehensive test pattern is executed. Thereby, it may be possible to efficiently evaluate whether the specification of the display arbitration control is provided as intended.

The specification related to the display arbitration control is generated based on the rule-based arbitration specification model. It may be possible to easily generate the specification.

In the above, the rule definition file is executed by using the comprehensive test pattern according to the arbitration logic in the PC simulator 6, and the automatic simulation is executed. However, the behavior of the display arbitration control may be evaluated by may simulating the rule definition file without using the execution function of the comprehensive test pattern.

While the present disclosure has been described based on the embodiment, the present disclosure is not limited to the embodiment or structure described herein. The present disclosure encompasses various modifications and variations within the scope of equivalents. Additionally, various combinations and configurations, as well as other combinations and configurations including more, less, or only a single element, are within the scope and spirit of the present disclosure. The specification generation tool 3 or the model validation tool 4 may be omitted.

The control and procedures described in the present disclosure may be implemented by a special purpose computer created by configuring a memory and a processor programmed to execute one or more particular functions embodied in computer programs. Alternatively, the control and procedures described in the present disclosure may be implemented by a special purpose computer created by configuring a processor provided by one or more special purpose hardware logic circuits. Alternatively, the control and procedures described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. An evaluation apparatus, comprising:
    a generation processor configured to generate: an image, which shows a vehicle speed, an engine rotation number, a shift position or a remaining amount of fuel; a display area that includes a first area and a second area; a rule that satisfies a condition that the first area is hidden when the second area is displayed; and a test pattern;
    a display that includes a head up display placed inside a vehicle and is configured to display at least one of the content or the display area; and
    a simulation processor configured to simulate whether a combination of the image and the display area satisfies the rule based on the test pattern and output a simulation result.

2. An evaluation apparatus for display arbitration control, comprising:
    a model generation portion configured to
        model the display arbitration control and
        generate a rule-based arbitration specification model that includes
            a content definition that defines a content,
            an area definition that defines a display area, and
            a constraint expression that shows a constraint related to display of the content;
    a rule definition file generation portion configured to generate a rule definition file for software that is installed in a product and is related to the display arbitration control, based on the rule-based arbitration specification model after a validation result of a validated rule-based arbitration specification model is confirmed to be positive;
    a comprehensive test pattern generation portion configured to generate a comprehensive test pattern based on the rule-based arbitration specification model; and
    a simulation portion configured to
        execute automatic simulation of whether a combination of the content defined by the content definition and the display area defined by the area definition satisfies the constraint shown by the constraint expression, by using the comprehensive test pattern, and output a simulation result as a test result log.

3. The evaluation apparatus for the display arbitration control according to claim 2, wherein:
    the simulation portions is configured to,
        when a model of an evaluation target is a new model, newly generate the comprehensive test pattern and execute the automatic simulation by using the comprehensive test pattern that is newly generated, and,
        when the model of the evaluation target is not the new model and has specification change, evaluate the automatic simulation by using the comprehensive test pattern that is previously generated without newly generating comprehensive test pattern.

4. The evaluation apparatus for the display arbitration control according to claim 2, further comprising:
    a model validation portion configured to validate whether the rule-based arbitration specification model has a contradiction.

5. The evaluation apparatus for the display arbitration control according to claim 2, further comprising:
    a specification generation portion configured to generate a specification related to the display arbitration control based on the rule-based arbitration specification model.

6. A generation apparatus for a rule definition file, comprising:
    a model generation portion configured to
        model display arbitration control and
        generate a rule-based arbitration specification model that includes
            a content definition that defines a content,
            an area definition that defines a display area, and
            a constraint expression that shows a constraint related to display of the content; and
    a rule definition file generation portion configured to generate the rule definition file for software that is installed in a product and is related to the display arbitration control, based on the rule-based arbitration specification model after a validation result of a validated rule-based arbitration specification model is confirmed to be positive.

7. The evaluation apparatus for the display arbitration control according to claim 2, further comprising:
    one or more processors that includes the model generation portion, the rule definition file generation portion, the comprehensive test pattern generation portion, and the simulation portion; and
    a memory coupled to the one or more processors and storing program instructions.

8. The generation apparatus for the rule definition file according to claim 6, further comprising:
    one or more processors that includes the model generation portion and the rule definition file generation portion; and
    a memory coupled to the one or more processors and storing program instructions.

9. The evaluation apparatus for the display arbitration control according to claim 2, wherein:
    the rule definition file is a file obtained by converting a file of the rule-based arbitration specification model based on a predetermined format.

10. The generation apparatus for the rule definition file according to claim 6, wherein:
    the rule definition file is a file obtained by converting a file of the rule-based arbitration specification model based on a predetermined format.

* * * * *